Figure 3:
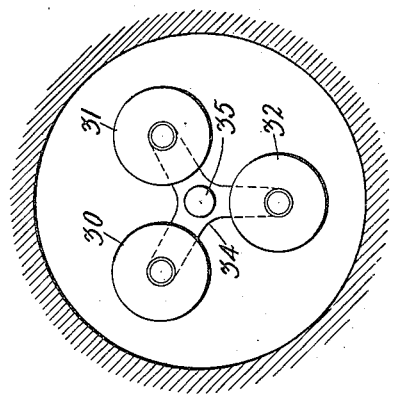

H. C. HARRISON.
SUBMARINE SIGNALING.
APPLICATION FILED JULY 12, 1919.

1,409,341.

Patented Mar. 14, 1922.

Inventor:
Henry C. Harrison.
by J. G. Roberts
Att'y.

UNITED STATES PATENT OFFICE.

HENRY C. HARRISON, OF PORT WASHINGTON, NEW YORK, ASSIGNOR TO WESTERN ELECTRIC COMPANY, INCORPORATED, OF NEW YORK, N. Y., A CORPORATION OF NEW YORK.

SUBMARINE SIGNALING.

1,409,341.      Specification of Letters Patent.     Patented Mar. 14, 1922.

Application filed July 12, 1919. Serial No. 310,458.

*To all whom it may concern:*

Be it known that I, HENRY C. HARRISON, a citizen of the United States, residing at Port Washington, in the county of Nassau, State of New York, have invented certain new and useful Improvements in Submarine Signaling, of which the following is a full, clear, concise, and exact description.

This invention relates to submarine signaling and more particularly to a device for detecting or receiving vibrations in the water set up by submarine signaling apparatus or by the movement of a submarine vessel in neighboring waters.

In connection with detecting apparatus for submarine signaling systems and more particularly detectors for giving warning of the proximity of enemy submarine vessels, it is of importance that the apparatus be of high sensitivity in order to be operated satisfactorily by the feeble vibrations propagated through the water. Not only is it of importance that the apparatus be highly efficient initially but it is also necessary to insure that this efficiency is not impaired as the result of long immersion or otherwise appreciably affected by changes in operating conditions. In detectors employing a diaphragm, one side of which is in contact with the water, more or less trouble has been experienced due to the hydrostatic pressure acting upon the diaphragm when the apparatus is submerged. This pressure tends to bow the diaphragm inward, thus making it less sensitive to vibrations and if a microphone unit is attached to the diaphragm, the carbon granules are pressed together causing a packing which still further decreases the sensitiveness of the instrument. Again, with a device of this type in which the diaphragm is acted upon by hydrostatic pressure, a change of head due to the action of waves may cause sufficient movement of the diaphragm to make the device noisy and therefore unsatisfactory for the work in hand.

It is the object of the present invention to provide a device of high sensitivity for the detection of under-water vibrations and to so arrange the parts that the sensitivity of the instrument is not affected by hydrostatic pressure exerted upon the diaphragm. A further object of the invention is to provide a device in which movement of the diaphragm does not result from the change of head due to wave action.

To accomplish these objects and in accordance with a feature of this invention, there is provided a sound responsive device provided with a plurality of diaphragms, so mounted as to respond in unison, and a device for altering the characteristics of a circuit arranged in operative relation with one of the diaphragms. In accordance with another feature of the invention, a plurality of circuit-varying devices are arranged in operative relation with one of a plurality of vibrating diaphragms adapted to respond in unison.

Figure 2:
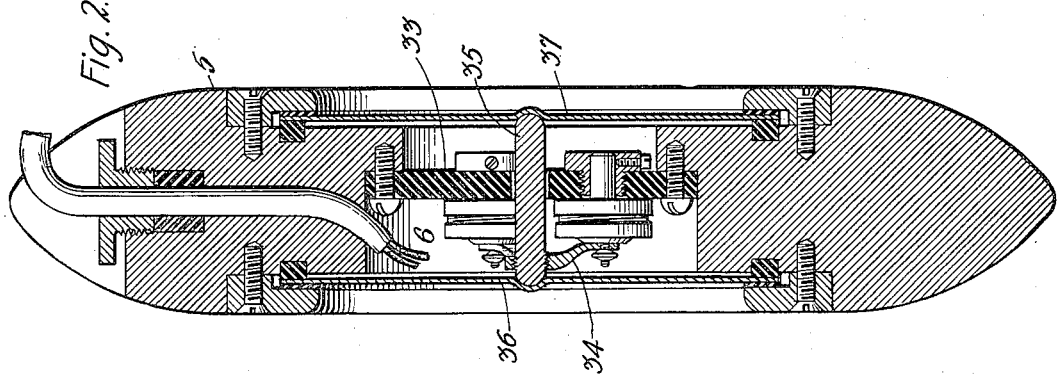
Figure 1:
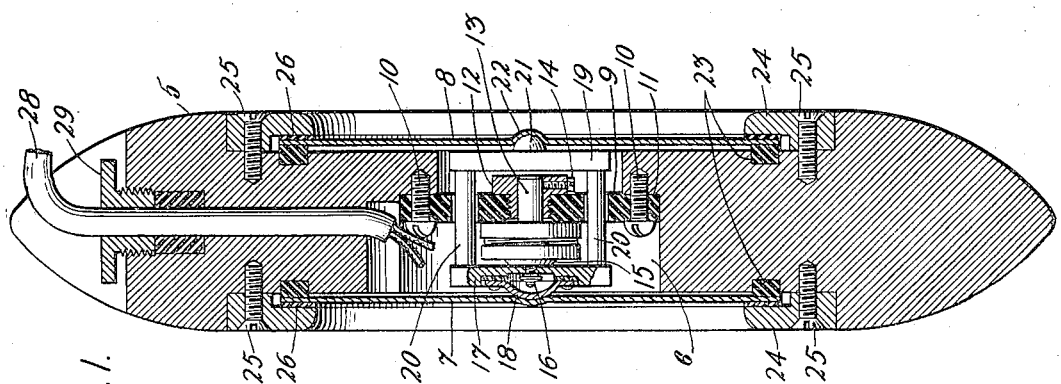

These and other features of the invention will be more clearly understood by reference to the accompanying drawing in which Fig. 1 is a sectional view of a detecting device embodying the features of this invention; Fig. 2 is a sectional view of a modification of the device shown in Fig. 1 but equipped with a plurality of microphone units; and Fig. 3 is a partial view showing the arrangement of the transmitter buttons as employed in the device of Fig. 2.

Referring now to these drawings, there is provided a disc-shaped mounting or casing 5. which is preferably of bronze to withstand the action of the salt water. The central portion of this mounting is provided with an opening 6 in which the microphone unit is mounted and the sides of this opening are closed by the diaphragms 7 and 8. A mounting plate 9 of hard rubber or similar insulating material is secured by means of the screws 10—10 to the annular shoulder portion 11. The central portion of this mounting plate is provided with a threaded opening adapted to receive the metal bushing 12 which in turn is provided with an opening to receive the stem 13 of a transmitter button of the ordinary type. A set screw 14 threads into the bushing 12 and bears against stem 13 to hold the button securely in position. The front electrode 15 of the transmitter button is secured by means of the nut 16 to support 17, and riveted or otherwise secured to this support is a U-shaped member 18 which is adapted to bear against an indentation in the diaphragm 7. The support 17 is secured to a similar support 19 by means of the rods 20—20, and a projection 21 of the support 19 is adapted to engage the depressed portion 22 of diaphragm 8. To prevent the entrance of water within the interior of the casing, gaskets 23—23 consisting preferably of rings of soft rubber are fitted in depressed portions in the casing 5 against which the diaphragms are firmly clamped by means of the clamping rings 24—24 which are held in place by means of the screws 25—25. Soft rubber rings 26—26 are inserted between the diaphragms and the clamping rings as shown. The upper portion of the casing is provided with an opening to receive the conducting cable 28, a stuffing box 29 being provided, as shown, to prevent the entrance of water along this cable.

The structure of Fig. 2 differs from that of Fig. 1 in that three microphone elements 30, 31 and 32 are mounted 120° apart on the insulating mounting plate 33. The front electrodes of these units are secured to a spider or support 34, the hub portion of which is adapted to thread onto a post 35. The ends of post 35 are formed to fit within similarly shaped depressions in the diaphragms 36 and 37.

In both of the structures described, the two diaphragms are rigidly connected together at their centers in such a manner that the hydrostatic pressure exerted on one diaphragm tends to counterbalance the similar pressure exerted on the other diaphragm, thereby preventing movement of the diaphragms due to change in hydrostatic pressure, or other changes acting equally on opposite surfaces of the diaphragms.

What is claimed is:

1. A vibration responsive device comprising a disc-shaped mounting plate having an opening centrally located therein, a pair of flexible diaphragms closing the ends of the opening, means for compelling the diaphragms to vibrate in unison, and means responsive to the vibration of one of said diaphragms to vary the electrical characteristics of a circuit.

2. A vibration responsive device comprising a disc-shaped mounting plate having an opening centrally located therein, a pair of flexible diaphragms closing the ends of the opening, means for compelling the diaphragms to vibrate in unison, and a transmitter button rigidly connected to the mounting plate and having its movable electrode in operative relation with one of said diaphragms.

3. A vibration responsive device comprising a disc-shaped mounting plate having an opening centrally located therein, a pair of flexible diaphragms closing the ends of the opening, means for compelling the diaphragms to vibrate in unison, and a plurality of transmitter buttons arranged in operative relation with one of said diaphragms.

In witness whereof, I hereunto subscribe my name this 3rd day of July, A. D., 1919.

HENRY C. HARRISON.